United States Patent
Greywall

(10) Patent No.: US 7,344,262 B2
(45) Date of Patent: Mar. 18, 2008

(54) MEMS MIRROR WITH TIP OR PISTON MOTION FOR USE IN ADAPTIVE OPTICS

(75) Inventor: Dennis S. Greywall, Whitehouse Station, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 414 days.

(21) Appl. No.: 10/953,960

(22) Filed: Sep. 29, 2004

(65) Prior Publication Data

US 2006/0066964 A1    Mar. 30, 2006

(51) Int. Cl.
*G02B 5/08*    (2006.01)

(52) U.S. Cl. ...................................... 359/849; 359/846

(58) Field of Classification Search ................ 359/223, 359/224, 290, 291, 849
See application file for complete search history.

(56) References Cited

U.S. PATENT DOCUMENTS 5,959,760 A * 9/1999 Yamada et al. ............. 359/224
2002/0164111 A1 * 11/2002 Mirza ........................... 385/18
2004/0245888 A1 * 12/2004 Aksyuk et al. ............. 310/309

* cited by examiner

*Primary Examiner*—Timothy Thompson
*Assistant Examiner*—Jerry Fang
(74) *Attorney, Agent, or Firm*—Eugene J. Rosenthal

(57) ABSTRACT

An array of high fill factor mirrors has each mirror be coupled across two deformable spring bars that are deformed using a drive. The two deformable springs are parallel to each other, and coupled together, e.g., by a cross bar. A support is coupled at one end to the cross bar and at its opposite end to the mirror. Coupled across the deformable spring bars on the opposite side thereof from the mirror support, is at least one moveable drive plate. Motion by the moveable drive plate causes the deformable spring bars to torque, e.g., in the local vicinity of the connection of the drive plate to the deformable spring bars. The torque causes the deformable spring bars to move downward, e.g., near their centers. As a result, cross bar, and hence the mirror, move downward.

39 Claims, 10 Drawing Sheets

100

500

600

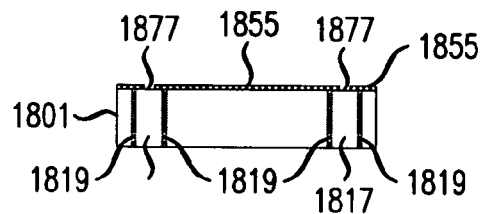
FIG. 18A  FIG. 19A
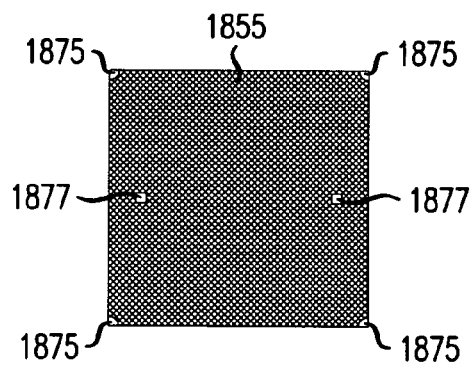
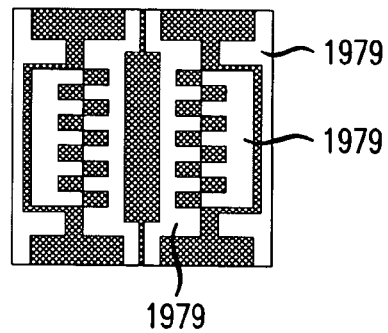
FIG. 18B  FIG. 19B
FIG. 20A  FIG. 21A
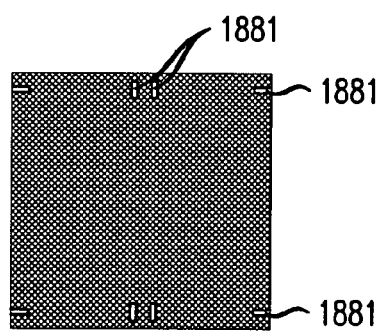
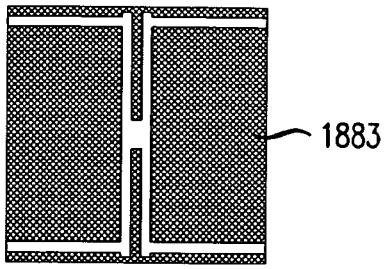
FIG. 20B  FIG. 21B

MEMS MIRROR WITH TIP OR PISTON MOTION FOR USE IN ADAPTIVE OPTICS The U.S. Government has a paid-up license in this invention and the right in limited circumstances to require the patent owner to license others on reasonable terms as provided for by the terms of contract Nos. HR0011-04-C-0048 and N6601-04-C-8028 awarded by DARPA.

TECHNICAL FIELD

This invention relates to micro-electromechanical systems (MEMS), and more particularly, to plates that can controllably tip or piston.

BACKGROUND OF THE INVENTION

Certain optical applications of micro-electromechanical systems (MEMS) require the fabrication of arrays of micro mirrors that are relatively small, e.g., on the order of 5 microns across. It is also desired for such applications that there be a high fill factor for the micro mirrors, so, for example, they should be rectangular or hexagonal in shape.

Micro mirrors are typically steered electrostatically by a set of electrodes underneath. Often the voltage used to control the position of such mirrors is relatively high, e.g., greater than 50 volts. However, it has been recognized that for certain applications it would be desireable that the voltage be much lower, e.g., on the order of 5 volts or less, so that the voltage employed is compatible with current digital electronic technology.

SUMMARY OF THE INVENTION

I have recognized that an array of high fill factor mirrors that are operable with voltages compatible with current digital electronic technology, may be achieved, in accordance with the principles of the invention, by having each mirror be a plate coupled across two deformable spring bars which are deformed using a drive. More specifically, the two deformable springs may be substantially parallel to each other, and they are effectively coupled, such as by a cross bar which may be located across their centers. A support, e.g., a post, is coupled at one end to the middle of the cross bar, and the support is further coupled at its opposite end to a plate, e.g., the mirror. Coupled across the deformable spring bars on the opposite side thereof from the mirror support, is at least one moveable drive plate. Typically the moveable drive plate is coupled between the center of the deformable spring bars and at least one end thereof. The moveable drive plate, when it moves, causes the deformable spring bars to torque, e.g., in the local vicinity of the connection of the drive plate to the deformable spring bars. The torque causes the deformable spring bars to move downward, e.g., near their centers. As a result, cross bar, and hence the mirror plate too, move downward as well.

If each of the deformable spring bars are supported at both of their ends, then the resulting motion of the mirror due to the applied torque is a piston motion. If each of the deformable spring bars is supported only at the same one of their ends, i.e., to form a cantilever, then the resulting motion of the mirror due to the applied torque is a tilt motion.

The moveable drive plate mates with a fixed drive plate, which when energized causes the moveable drive plate to move toward it. The moveable drive plate and the fixed drive plate may, advantageously, be a so-called "torsional comb drive". To this end, the drive plates may include comb "teeth".

In one embodiment of the invention, the bar coupling the centers of the two deformable springs is split at least partway across. Doing so lowers the spring constant of the entire structure, rendering it "softer" and requiring a lower voltage to achieve a desired displacement.

Advantageously, all of the support and actuator components for each mirror are substantially limited to the area beneath the mirror plate. Additionally, parts of the support can double as an electrical guard between the mirrors to prevent cross talk between them. Additional guard elements not required for a support function may also be included to improve the prevention of cross talk between the mirrors. Alternatively, the supports of adjacent mirrors may be arranged at 90 degrees to each other, effectively providing the maximum prevention of cross talk between the mirrors without requiring additional guard elements.

Furthermore, the spring support structure for the mirror plate is stiff in the lateral direction, which allows the neighboring mirror plates to be placed close together without concern that adjacent mirrors will touch each other or stick to each other.

Advantageously, because of the high density of mirrors that can be achieved, an array of mirrors can be employed to function as a computer controlled mask for use in fabricating other devices in lieu of conventional masks. Further advantageously, use of a comb drive minimizes the likelihood of undesirable snapdown occurring.

An additional advantage is that such mirrors may be controllably moved using voltages compatible with modern digital electronics, rather than the higher voltages employed with prior art arrangements.

BRIEF DESCRIPTION OF THE DRAWING

In the drawing:

FIG. 16c shows a top view of the exemplary embodiment of the invention shown in FIG. 16a;

FIG. 17c shows a top view of the exemplary embodiment of the invention shown in FIG. 17a; and FIGS. 18–24 show the results after various processing steps that are undertaken to fabricate a structure which can activate a plate, e.g., a micro mirror, so as to move the plate with a piston motion, such as the one shown in FIG. 6 which includes comb drives and a split cross bar.

DETAILED DESCRIPTION

Figure 1:
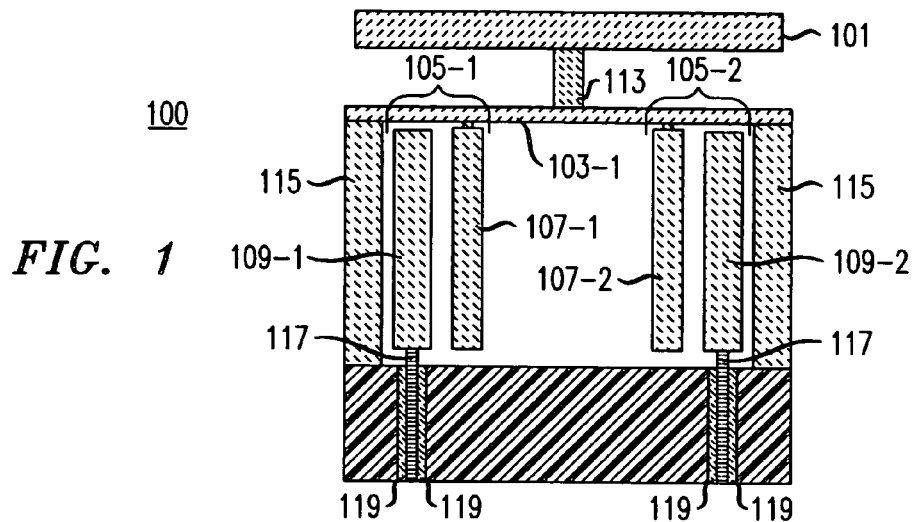
FIG. 1 shows a cross-section of an exemplary structure which can activate a plate, e.g., a micro mirror, so as to move the plate with a piston motion, in accordance with the principles of the invention.

The following merely illustrates the principles of the invention. It will thus be appreciated that those skilled in the art will be able to devise various arrangements that, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function. This may include, for example, a) a combination of electrical or mechanical elements which performs that function or b) software in any form, including, therefore, firmware, microcode or the like, combined with appropriate circuitry for executing that software to perform the function, as well as mechanical elements coupled to software controlled circuitry, if any. The invention as defined by such claims resides in the fact that the functionalities provided by the various recited means are combined and brought together in the manner which the claims call for. Applicant thus regards any means which can provide those functionalities as equivalent as those shown herein.

Unless otherwise explicitly specified herein, the drawings are not drawn to scale.

Additionally, unless otherwise explicitly specified herein, any lens shown and/or described herein is actually an optical system having the particular specified properties of that lens. Such an optical system may be implemented by a single lens element but is not necessarily limited thereto. Similarly, where a mirror is shown and/or described what is actually being shown and/or described is an optical system with the specified properties of such a mirror, which may be implemented by a single mirror element but is not necessarily limited to a single mirror element. This is because, as is well known in the art, various optical systems may provide the same functionality of a single lens element or mirror but in a superior way, e.g., with less distortion. Furthermore, as is well known in the art, the functionality of a curved mirror may be realized via a combination of lenses and mirrors and vice versa. Moreover, any arrangement of optical components that are performing a specified function, e.g., an imaging system, gratings, coated elements, and prisms, may be replaced by any other arrangement of optical components that perform the same specified function. Thus, unless otherwise explicitly specified here, all optical elements or systems that are capable of providing specific function within an overall embodiment disclosed herein are equivalent to one another for purposes of the present disclosure.

The term micro-electromechanical systems (MEMS) device as used herein is intended to mean an entire MEMS device or any portion thereof. Thus, if a portion of a MEMS device is inoperative, or if a portion of a MEMS device is occluded, such a MEMS device is nonetheless considered to be a MEMS device for purposes of the present disclosure.

In the description, identically numbered components within different ones of the FIGS. refer to the same components.

Shown in FIG. 1 is a cross-section of exemplary structure 100 which can activate a plate, e.g., a micro mirror, so as to move the plate with a piston motion, in accordance with the principles of the invention. Advantageously, such structures may be relatively small, e.g., on the order of 5 microns across. It is also possible to achieve a high fill factor for the micro mirrors. Further advantageously, structure 100 may be operated with the relatively low voltages compatible with modern digital electronics.

Structure 100 includes plate 101, e.g., a micro mirror, which is coupled across two deformable spring bars 103, which includes deformable spring bars 103-1 and 103-2, only one of which, e.g., deformable spring bar 103-1, can be seen in FIG. 1. Both of deformable spring bars 103 can be seen in FIG. 3, which is a top view of structure 100. Each of deformable spring bars 103 is deformed simultaneously by using at least one, and preferably both, of drive 105-1 or drive 105-2, collective referred to herein as drives 105. Although plate 101 is shown as being substantially square in FIG. 3, plate 101 may be any shape, even round or irregular shapes. Preferably plate 101 has a shape that is conducive to close packing, which includes not only the substantially square shape shown in FIG. 3 but may also include shapes such as being substantially rectangular and substantially hexagonal.

Each of drives 105 is made up of at least one of moveable drive plate 107. Each of moveable drive plates 107 mates with a respective one of fixed drive plate 109-1 or fixed drive plate 109-2, collectively herein fixed drive plates 109. Preferably each of moveable drive plates 107 is grounded. When any of fixed drive plates 109 is energized, by applying a potential different relative to its associated one of moveable drive plates 107, it causes its associated one of moveable drive plates 107 to move toward it, e.g., as shown in FIG. 2, which is the same view of structure 100 as shown in FIG. 1, but where fixed drive plates 109 have been energized.

Figure 3:
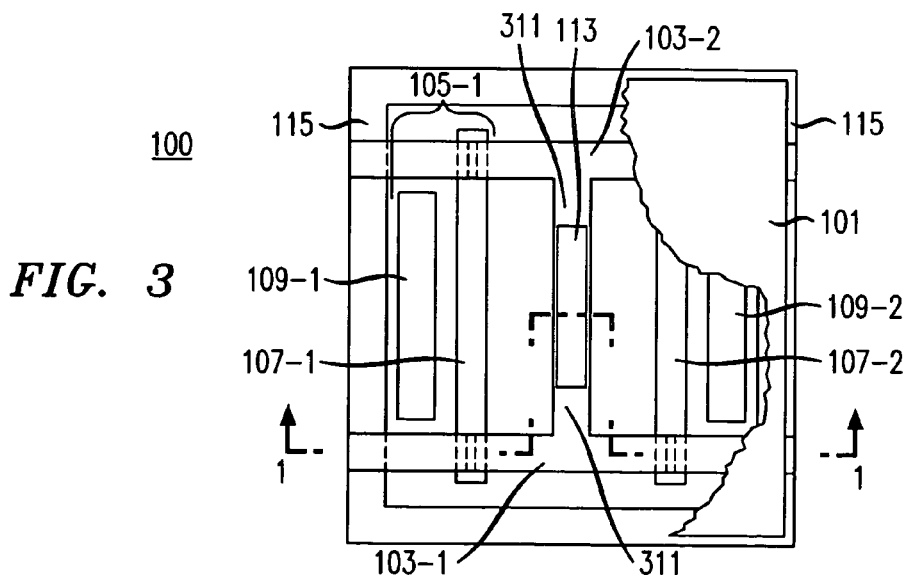
FIG. 3 is a top view of the structure shown in FIG. 1.

As shown in FIG. 3, which is a top view of structure 100 with plate 101 removed, deformable spring bars 103 are parallel to each other, and coupled, e.g., at their centers by cross bar 311. The coupling of spring bars 103 by cross bar 311 essentially forms a single unified spring support. Coupled to the unified spring support, at cross bar 311, e.g., in the middle thereof, is support 113, e.g., a bar or post, which is shown in FIG. 1. As shown in FIG. 3, support 113 is a bar. Note that if support 103 is made as wide as cross bar 311, essentially there is only a single combined cross bar-support. Support 113 is further coupled at its opposite end to plate 101.

Figure 2:
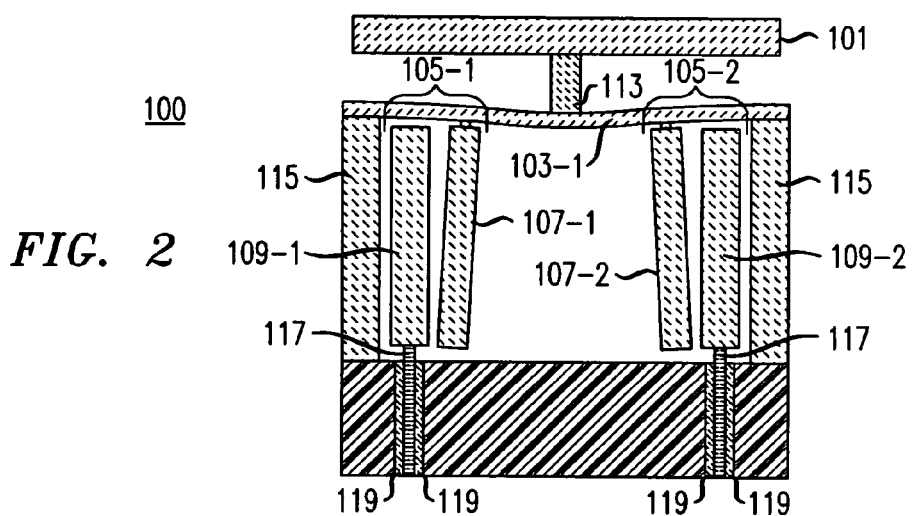
FIG. 2 shows the same structure as shown in FIG. 1, but where the fixed drive plates have been energized so as to cause the moveable drive plates to move.

When any of moveable drive plates 107 moves towards its respective associated one of fixed drive plates 109, as shown in FIG. 2, each of deformable spring bars 103 are caused to torque in the local vicinity of their connections to the moving moveable drive plate. The torque causes deformable spring bars 103 to move downward near their centers, e.g., at the points that are coupled to cross bar 311. As a result, plate 101 moves downward as well. Since each of deformable spring bars 103 are supported at both of their ends by walls 115, the resulting motion of plate 101 due to the applied torque is, advantageously, a piston motion. Deformable spring bars 103 exert a countering restorative force, which causes plate 101 to move back toward an upright position when the energizing is reduced or eliminated.

In the embodiment of the invention shown in FIG. 1, fixed drive plates 109 are coupled to the potential difference via a through-wafer connection. This connection has a conducting portion 117, through which the potential is supplied, and an electrical insulating portion 119, which is typically annular, that insulates the one of fixed drive plates 109 from the substrate and hence from moveable drive plates 107 and walls 115.

Advantageously, all of the support and actuator components for each mirror are substantially limited to the area beneath the mirror plate. Additionally, walls 115 can double as an electrical guard between the mirrors to prevent cross talk between them.

Additional guard elements not required for a support function may also be included to improve the prevention of cross talk between the mirrors. Thus, walls 115 may be extended all the way around structure 100, as shown. Alternatively, there may only be two walls 115 and those of adjacent mirrors may be arranged at 90 degrees to each other, effectively providing the maximum prevention of cross talk between the mirrors without requiring additional elements.

Further advantageously, the spring support structure for the mirror plate is stiff in the lateral direction, which allows the neighboring mirror plates to be placed close together without concern that adjacent mirrors will touch each other or stick to each other.

Figure 4:
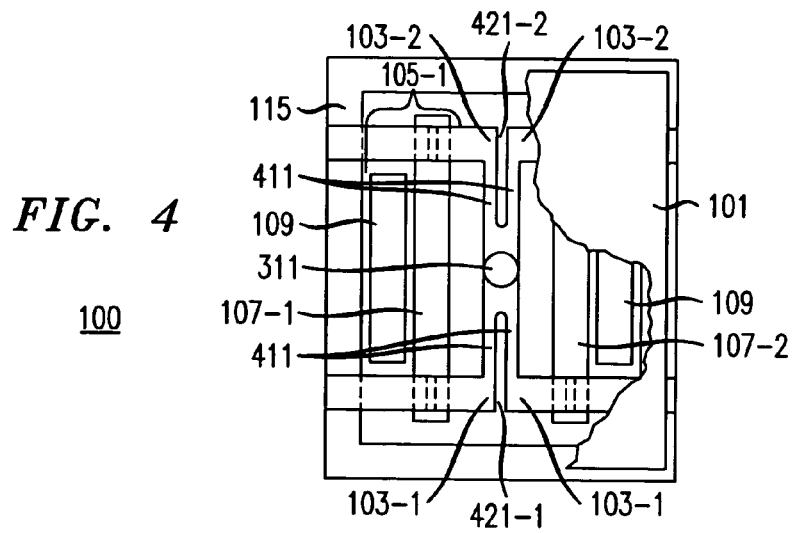
FIG. 4 is a top view of another exemplary version of the structure of FIG. 1 but with the plate removed and the cross bar replaced with a notched cross bar.

FIG. 4, is a top view of another version of structure 100 with plate 101 removed. As shown in FIG. 4, cross bar 311 is replaced with notched cross bar 411, which is notched so as to form therein slits 421, which includes slit 421-1 and 421-2. Doing so makes cross bar 411 not only couple spring bars 103 together to form the unified spring support, but the portions of cross bar 411 adjacent and parallel to slits 421 essentially become parts of one of springs 103 to which they are attached. Doing so makes the overall spring structure of FIG. 4 softer with respect to the overall spring structure of FIG. 3, thereby making it easier to bend. Thus, as compared with FIG. 3, advantageously, the exemplary embodiment of FIG. 4 requires a lower voltage to achieve a given piston displacement, all other things being equal. Also, in FIG. 4, support 113, which was shown in FIG. 3, as a bar, has been changed to a round post.

Figure 5:
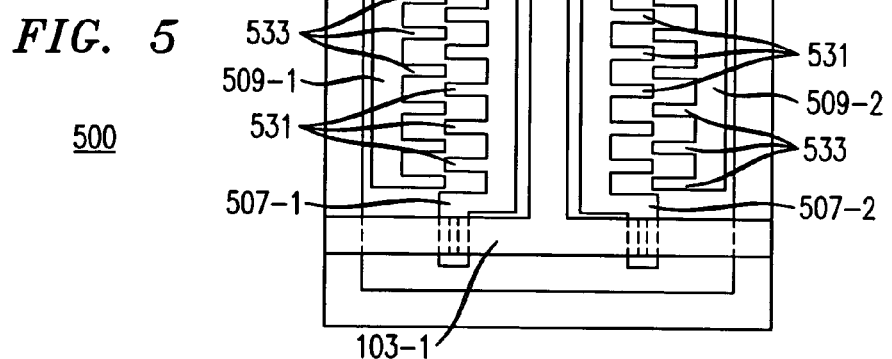
FIG. 5 is a top view of another exemplary version of the structure of FIG. 1 as shown in FIG. 3 but where comb drives have been substituted for the flat plate drives.

In FIGS. 3 and 4, drives 105 were shown as flat plate drives, i.e., the surface of the plates of the drive, are substantially flat. In FIG. 5, which is a top view of another exemplary version of structure 100 with plate 101 removed as shown in FIG. 3, comb drives have been substituted for the flat plate drives. Thus, each of comb drives 505, which includes comb drive 505-1 or 505-2, is made up of at least one of moveable comb drive plates 507. Each moveable comb drive plates 507 mates with a respective one of fixed comb drive plates 509. Preferably each of moveable comb drive plates 507 is grounded. Moveable comb drive plates have comb teeth 531 and fixed comb drive plates 509 have comb teeth 533. Energizing any of fixed comb drive plates 509, by applying a potential different relative to its associated one of moveable comb drive plates 507, causes the associated one of moveable comb drive plates 507 to move toward it. The result is the same as is shown in FIG. 2, because in the view of FIG. 2 (as well as the view of FIG. 1) the combs of a comb drive, should one be employed, cannot be seen.

Advantageously, since the force of a comb drive is linear with the square of the applied voltage, use of comb drives minimizes the likelihood of undesireable snapdown occurring.

Figure 6:
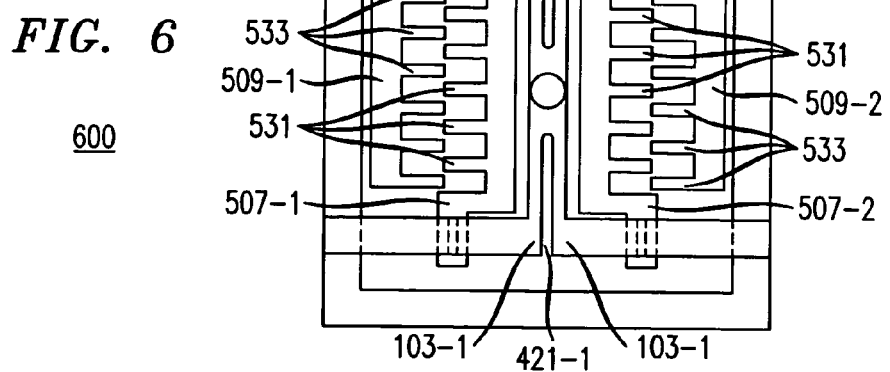
FIG. 6 shows a top view of another exemplary version of the structure of FIG. 1 with the plate removed as shown in FIG. 4, but in which comb drives have been substituted for the flat plate drives.

Similar to FIG. 5, FIG. 6 shows a top view of another exemplary version of structure 100 with plate 101 removed as shown in FIG. 4, but in which comb drives 505-1 and 505-2 have been substituted for the flat plate drives.

Figure 7:
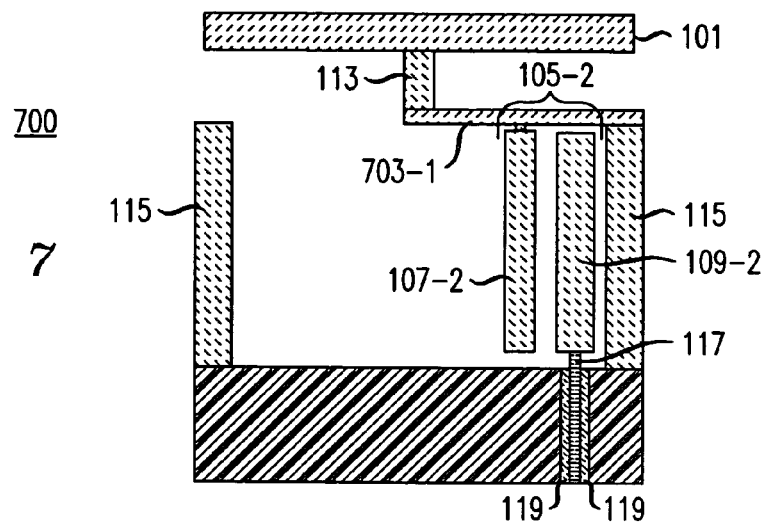
FIG. 7 shows another exemplary embodiment of the invention, similar to exemplary structure shown in FIG. 2, but in which the deformable spring bars are replaced by shortened versions thereof.

FIG. 7 shows an structure 700, another exemplary embodiment of the invention, similar to exemplary structure 100 of FIG. 2, but in which deformable spring bars 703, which includes deformable spring bars 703-1 and 703-2, only one of which, e.g., deformable spring bar 703-1, can be seen in FIG. 7, are shortened versions of spring bars 103. Each of spring bars 703 are supported only at the same one of their ends, i.e., to form a cantilever. Furthermore, drive 105-1 has been eliminated. As a result, when drive 105-2 is energized, the resulting motion of the mirror due to the torque applied by drive 105-1 on spring bars 103 is a tilt motion.

Figure 8:
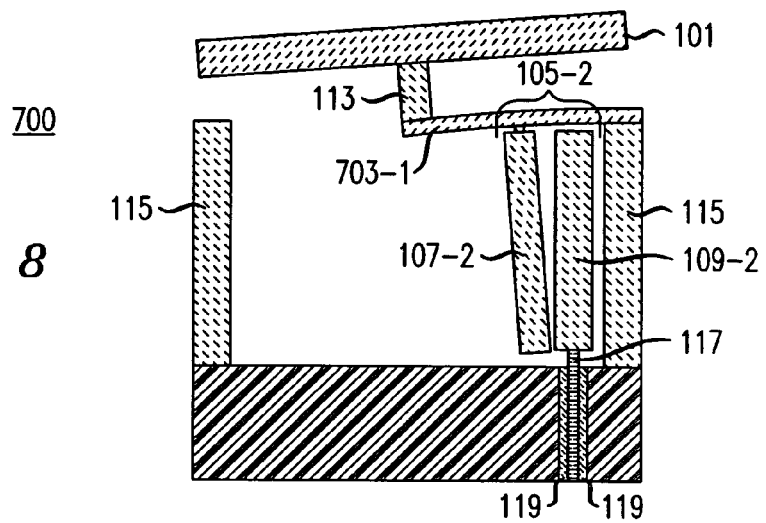
FIG. 8 shows the exemplary structure of FIG. 7 in an exemplary tilted position that results when a potential difference is applied between the moveable drive plate and the fixed drive plate.

FIG. 8 shows structure 700 in an exemplary tilted position that results when a potential difference is applied between moveable drive plate 107-2 and fixed drive plate 109-2.

Figure 9:
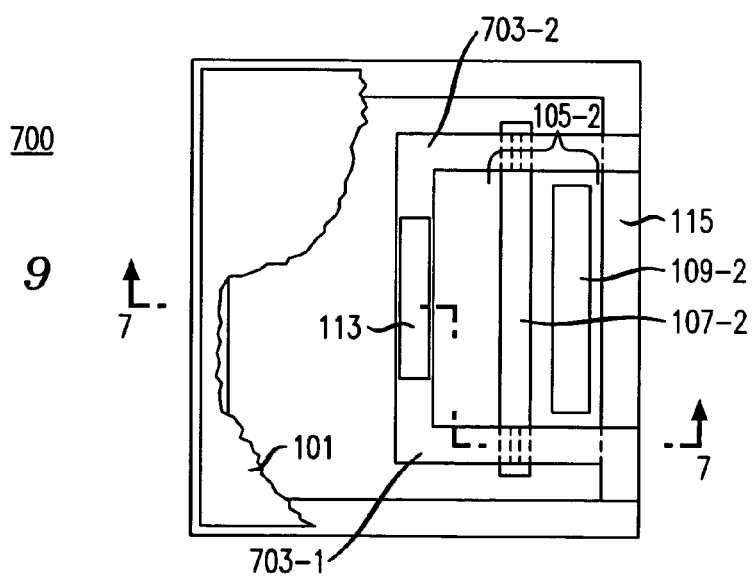
FIG. 9 is a top view of the exemplary structure of FIG. 7 when the drive is not a comb drive.

FIG. 9 is a top view of structure 700, when drive 105-2 is not a comb drive, i.e., when moveable drive plate 107-2 and fixed drive plate 109-2 are both flat plates. Optionally, drive 105-2 may be a comb drive.

Figure 10:
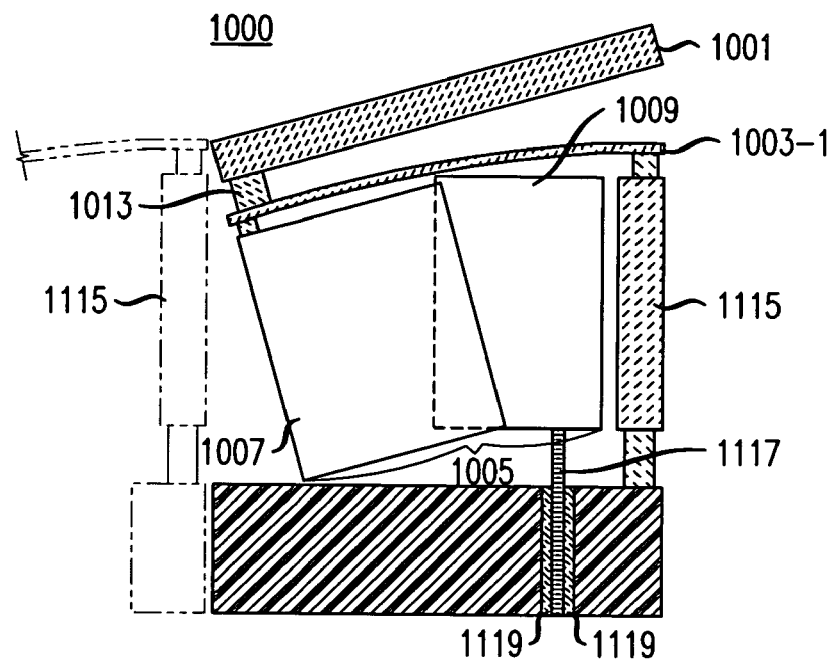
FIG. 10 shows another exemplary embodiment of the invention.

FIG. 10 shows structure 1000, another exemplary embodiment of the invention, which is similar to structure 700 of FIG. 7 in that it uses a cantilever to produce tilt motion in one direction. However, in FIG. 10 deformable spring bars 1003 extend nearly to where in FIG. 7 is located the one of walls 115 that is opposite the spring bars connection point. Furthermore, in FIG. 10 there is no opposite wall that is part of exemplary structure 1000. Instead, the opposite wall may be the one of walls 115 to which the spring bars of the next exemplary structure in an array of such structures are attached, shown in phantom in FIG. 1000. Alternatively, if the exemplary structure is at the end of the array, there may be not be a wall, or there may be a wall, which may be the material that is not etched away around the entire array. Furthermore, the function of the cross bar has been absorbed by the mirror plate itself as it couples spring bars 1003 together via supports 1013. Additionally, support 1013 of FIG. 10, is located toward the free end of spring bars 1003. Effectively, the plate 1001 rotates about the midpoint of the cantilever in its rest position, i.e., with no voltage applied. There is thus a small lateral displacement of plate 101 while it rotates, assuming that support 1013 is relatively short. Preferably, the displacement is as small as can be achieved by design given the available manufacturing processes. Also shown in FIG. 10 is drive 1005, including, at least moveable drive plate 1007 mated with fixed drive plate 1009.

Figure 11:
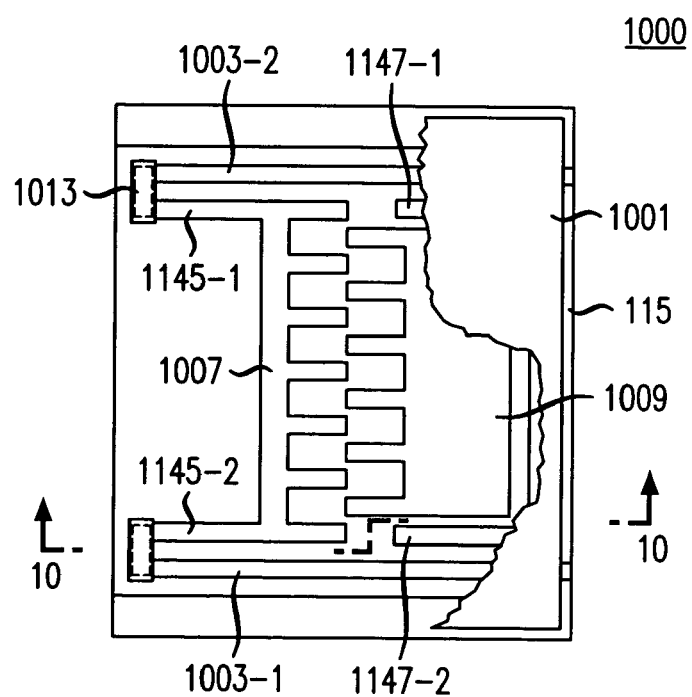
FIG. 11 shows a top view of the embodiment of the invention shown in FIG. 10 but with the plate removed.

FIG. 11 shows a top view of structure 1000 with plate 1001 removed. In FIG. 11, drive 1005 is a comb drive. Although moveable comb drive plate 1007 is attached to spring bars 1003 near their respective free ends, its plate and teeth are located away from the free end toward the fixed end, so that plate 1001 can have greater clearance with respect to avoiding striking of the top of fixed comb drive plate 1009. This may be achieved through the use of drive extension members 1145-1 and 1145-2. Shown in FIG. 11 also are optional stops 1147-1 and 1147-2, collectively stops 1147. Optional stops 1147 prevent the electrodes of drive 1005 from coming into contact in the event too great a potential difference is placed across them. Similar optional stops may be included in the other embodiments of the invention, at the discretion of the implementer. However, proper control of the applied voltages in any of the embodiments can avoid the need to include stops 1147.

Instead of having the function of the cross bar be absorbed by the mirror plate itself as it couples spring bars 1003 together via supports 1013, an actual cross bar coupling the springs at the location shown for supports 1013 may be used, with a single post connecting such a cross bar to the mirror, in the manner shown and described hereinabove.

Figure 12:
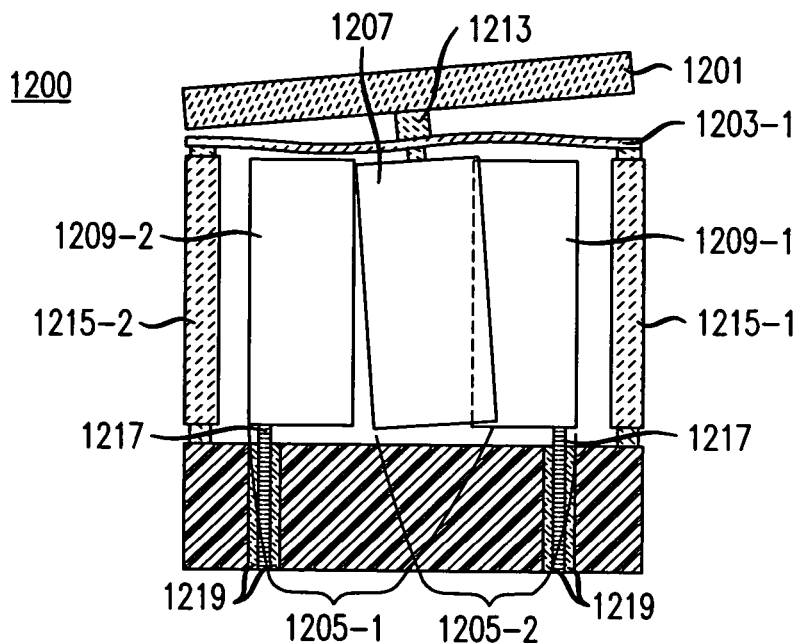
FIG. 12 another exemplary embodiment of the invention that can activate a plate such that it can be moved with tilt in two directions about a single axis.

Shown in FIG. 12 is a cross-section of structure 1200, another exemplary embodiment of the invention, which can activate a plate, e.g., a micro mirror, such that it can be moved with tilt in two directions about a single axis. Similar to structure 100 (FIG. 1), structure 1200 includes plate 1201, e.g., a micro mirror, which is coupled across two deformable spring bars 1203, which includes deformable spring bars 1203-1 and 1203-2, only one of which, e.g., deformable spring bar 1203-1, can be seen in FIG. 12. Both of deformable spring bars 1203 can be seen in FIG. 13, which is a top view of structure 1200. Each of deformable spring bars 1203 is deformed simultaneously by placing a potential difference across one of common comb drive 1205-1 or 1205-2, collective referred to herein as drives 1205. Each of common electrode drives 1205 is made up of moveable drive comb 1207 and one of drive combs 1209-1 or 1209-2, collectively, fixed drive combs 1209. Preferably moveable drive comb 1207 is coupled to spring bars 1203 at their midpoints, and preferably it is grounded. When any of fixed drive combs 1209 is energized, by applying a potential different relative to its moveable drive plate 1207, it causes moveable drive comb 1207 to move toward it. FIG. 12 shows fixed drive comb 1209-1 being energized, so that moveable drive plate 1207 has moved toward fixed drive comb 1209-1.

When moveable drive comb 1207 moves towards one of fixed drive plates 1209, as shown in FIG. 12, each of deformable spring bars 1203 is caused to torque in the local vicinity of their connections to moveable drive comb 1207. The torque causes deformable spring bars 1203 to bend so as to tip plate 1201, which is coupled to spring bars 1203 by crossbar 1311 and support 1213. Deformable spring bars 1203 exert a countering restorative force, which causes plate 1201 to move back toward an upright position when the energizing is reduced or eliminated.

Figure 13:
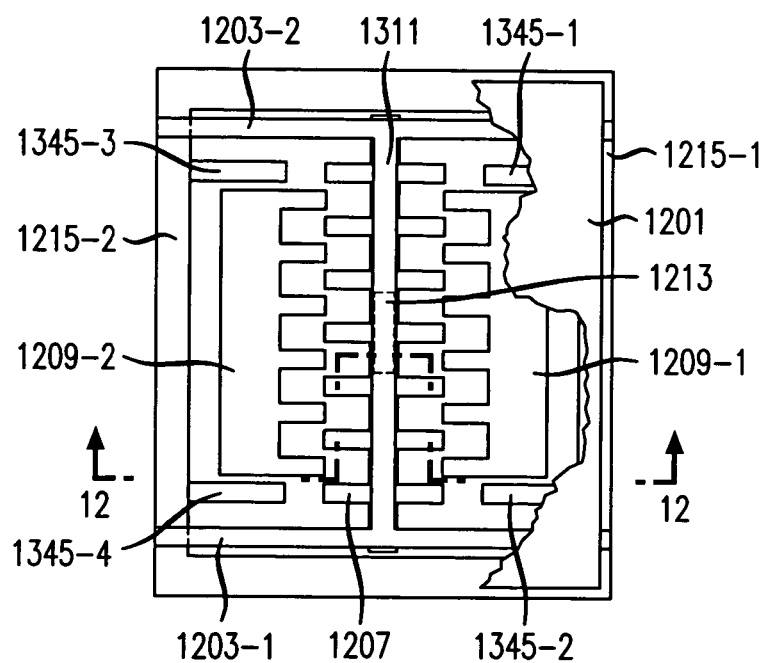
FIG. 13 shows a top view of the embodiment of the invention shown in FIG. 12 when it is not energized and with the plate removed.

As shown in FIG. 13, which is a top view of structure 1200 when it is not energized and with plate 1201 removed, deformable spring bars 1203 are parallel to each other, and coupled, e.g., at their centers, by cross bar 1311. The coupling of spring bars 1203 by cross bar 1311 essentially forms a single unified spring support. Coupled to the unified spring support, at cross bar 1311, e.g., in the middle thereof, is support 1213, e.g., a bar or post, which is shown in FIG. 12. As shown in FIG. 13, support 1213 is a bar. Note that if support 1203 is made as wide as cross bar 1311, essentially there is only a single combined cross bar-support. Support 1213 is further coupled at its opposite end to plate 1201.

Fixed drive combs 1209 are coupled, in FIG. 12, to the potential difference via a through-wafer connection. This connection has a conducting portion 1217, through which the potential is supplied, and an electrical insulating portion 1219, which is typically annular, that insulates the one of fixed drive combs 1209 from the substrate and hence from moveable drive comb 1207 and walls 1215.

Should a potential be applied to both of fixed drive combs simultaneously, plate 1201 will tilt based on which of common comb drives 1205 exerts a greater force, if any. However, the amount of tilt will be reduced by the counterbalancing force applied by the other of common comb drives 1205.

Figure 14:
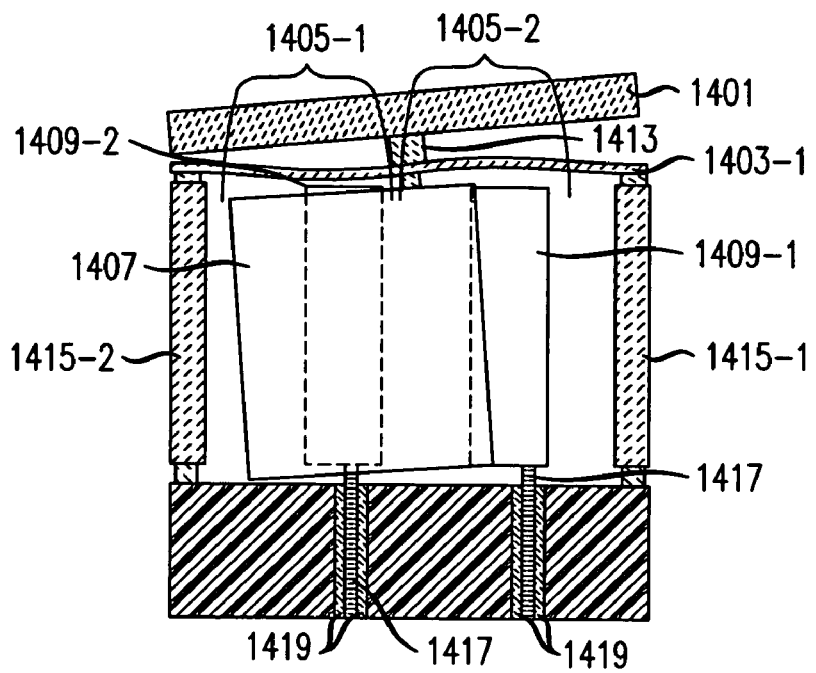
FIG. 14 shows a cross-section of another exemplary embodiment of the invention that can activate a plate such that it can be moved with tilt in one direction.

Shown in FIG. 14 is a cross-section of structure 1400, another exemplary embodiment of the invention, which can activate a plate, e.g., a micro mirror, such that it can be moved with tilt in one direction. Similar to structure 1200 (FIG. 12), structure 1400 includes plate 1401, e.g., a micro mirror, which is coupled across two deformable spring bars 1403, which includes deformable spring bars 1403-1 and 1403-2, only one of which, e.g., deformable spring bar 1403-1, can be seen in FIG. 14. Both of deformable spring bars 1403 can be seen in FIG. 15, which is a top view of structure 1400. Each of deformable spring bars 1403 is deformed simultaneously by placing a potential difference across one of comb drives 1405-1 or 1405-2, collective referred to herein as drives 1405. Each of comb drives 1405 is made up of one of moveable drive combs 1407-1 and 1407-2, collectively moveable drive combs 1407 and one of fixed drive combs 1409-1 or 1409-2, collectively, fixed drive combs 1409. Preferably moveable drive combs 1407 are coupled to spring bars 1403 at their midpoints, which may require tile use of extension arms 1445, and preferably they are grounded. When any of fixed drive combs 1409 is energized, by applying a potential different relative to its respective associated one of moveable drive plates 1407, it causes the associated one of moveable drive combs 1407 to move toward it. FIG. 14 shows fixed drive combs 1409 being energized, causing moveable drive plates 1407 to move toward their respective associated one of fixed drive combs 1409.

When any of moveable drive combs 1407 moves towards its associated one of fixed drive plates 1409, as shown in FIG. 14, each of deformable spring bars 1403 is caused to torque in the local vicinity of their connections to moveable drive comb 1407. The torque causes deformable spring bars 1403 to bend so as to tip plate 1401, which is coupled to spring bars 1403 by crossbar 1511 and support 1413. Spring bars 1403 exert a countering restorative force, which causes plate 1401 to move back toward an upright position when the energizing is reduced or eliminated.

Figure 15:
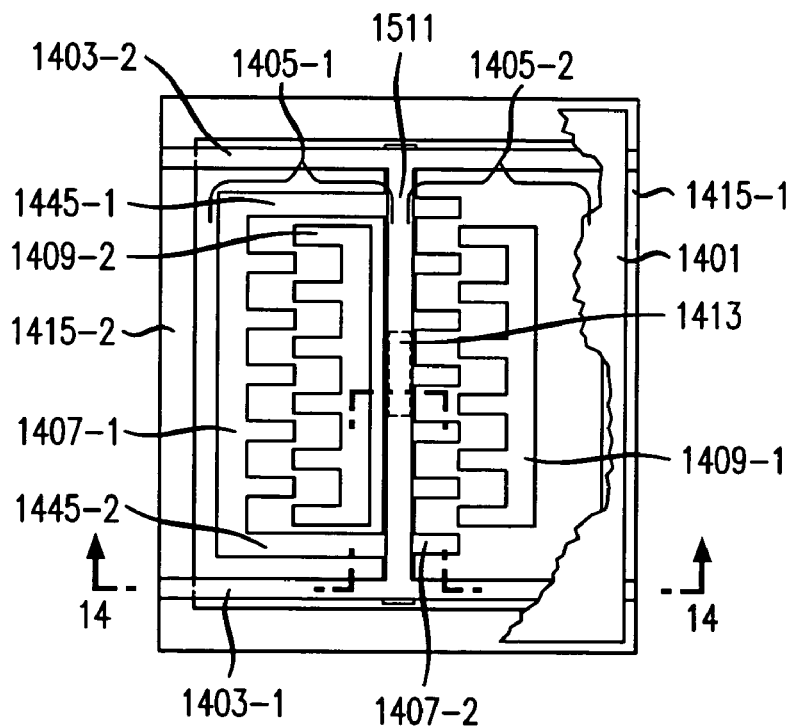
FIG. 15 shows a top view of exemplary embodiment of the invention shown in FIG. 14 but with the plate removed.

As shown in FIG. 15, which is a top view of structure 1400 with plate 1401 removed, deformable spring bars 1403 are parallel to each other, and coupled, e.g., at their centers by cross bar 1511. The coupling of spring bars 1403 by cross bar 1511 essentially forms a single unified spring support. Coupled to the unified spring support, at cross bar 1511, e.g., in the middle thereof, is support 1413, e.g., a bar or post, which is shown in FIG. 14. As shown in FIG. 15, support 1413 is a bar. Note that if support 1403 is made as wide as cross bar 1511, essentially there is only a single combined cross bar-support. Support 1413 is further coupled at its opposite end to plate 1401.

Fixed drive combs 1409 are coupled, in FIG. 14, to the potential difference via a through-wafer connection. This connection has a conducting portion 1417, through which the potential is supplied, and an electrical insulating portion 1419, which is typically annular, that insulates the one of fixed drive combs 1409 from the substrate and hence from moveable drive comb 1407 and walls 1415.

Advantageously, a potential applied to both of fixed drive combs 1409 simultaneously allows plate 1401 to be tilted while using a smaller voltage than if a voltage was applied to only one of them, or in an embodiment where only one of them existed. To this end, for example, as shown in FIG. 14, fixed drive combs 1409 may be electrically coupled.

Figure 16A:
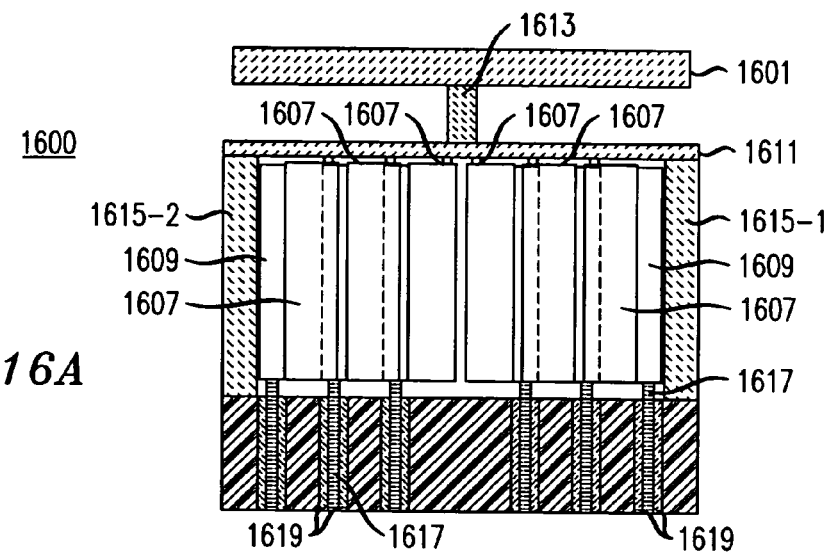
FIG. 16a another exemplary embodiment of the invention, similar to the one shown in FIG. 4, but in which there are multiple comb drives operating in parallel on each side of the cross bar.
Figure 16B:
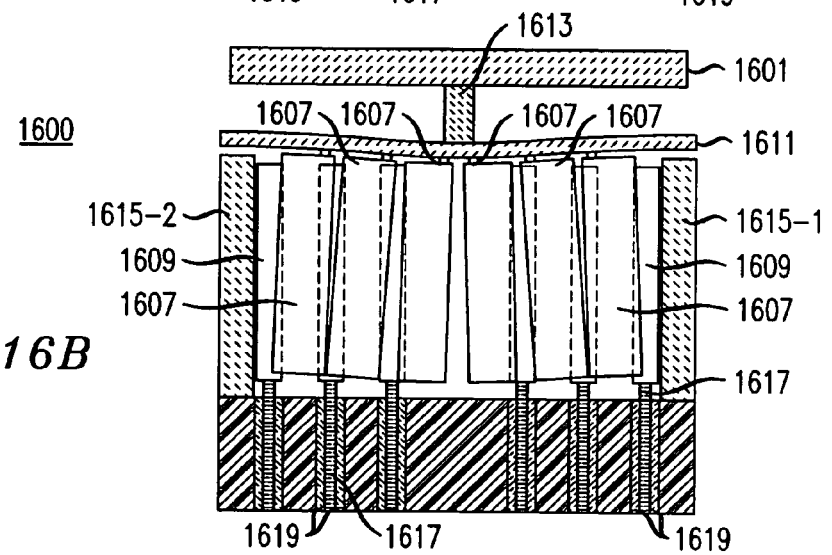
FIG. 16b shows the exemplary embodiment of the invention shown in FIG. 16a but where the drives are energized to achieve piston motion.
Figure 16C:
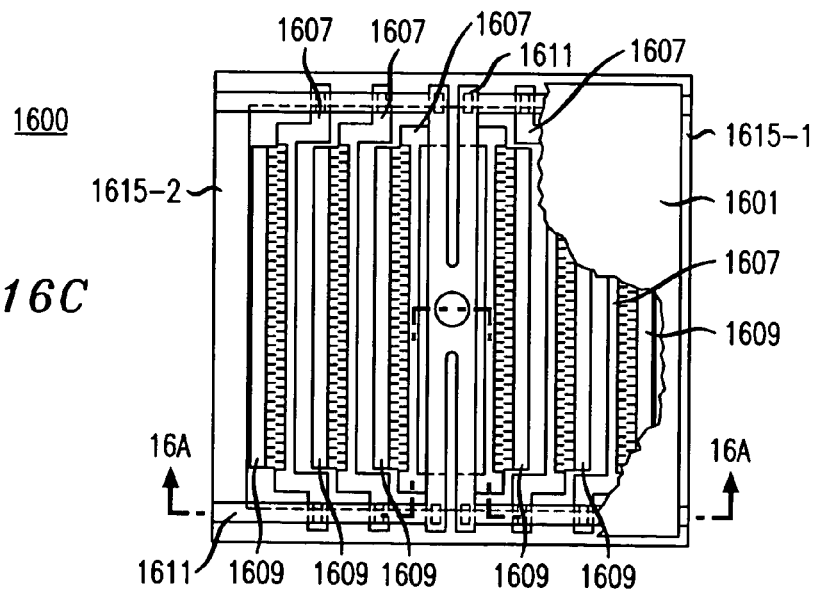

FIG. 16*a* shows structure 1600, another exemplary embodiment of the invention, that is similar to structure 100 as shown in FIG. 4, but in which there are multiple comb drives operating in parallel on each side of cross bar 1611. Advantageously, the same tilt motion may achieved using a smaller voltage than would be required in the embodiment of FIG. 4. FIG. 16*b* shows exemplary embodiment of the invention 1600 but where the drives are energized to achieve piston motion. FIG. 16*c* shows a top view of structure 1600.

Figure 17A:
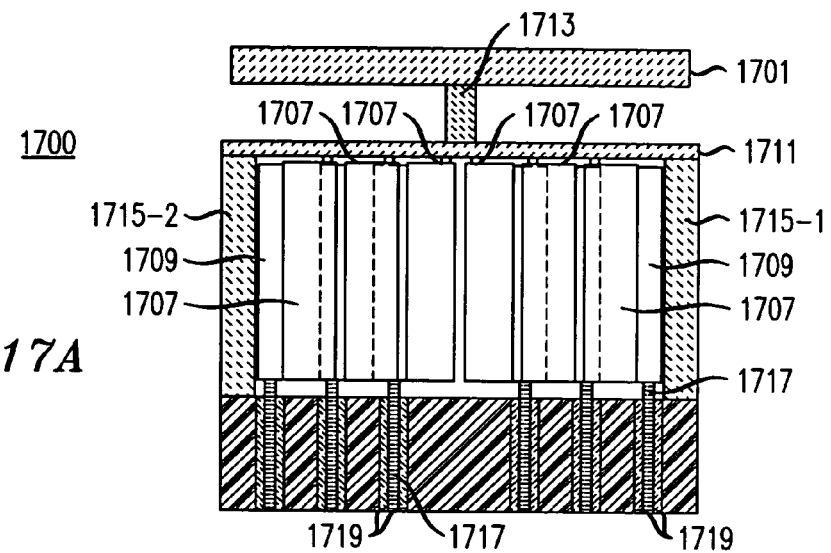
FIG. 17a shows another exemplary embodiment of the invention similar to the one shown in FIG. 16 but in which the comb teeth of each of the comb drives gets shorter the further the drive is from the cross bar.
Figure 17B:
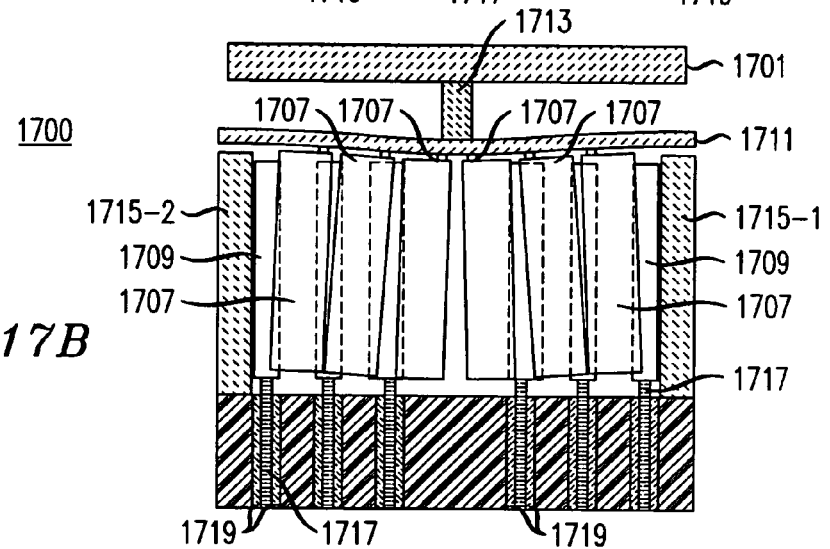
FIG. 17b shows the exemplary embodiment of the invention shown in FIG. 17a but where the drives are energized to achieve piston motion.
Figure 17C:
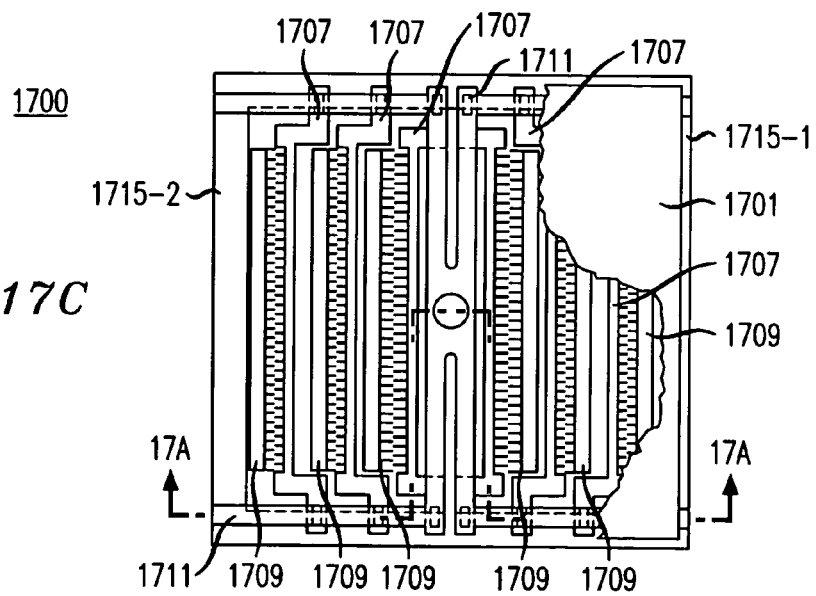

FIG. 17*a* shows structure 1700, another exemplary embodiment of the invention, which uses multiple comb drives operating in parallel on each side of cross bar 1611, thus being similar to structure 1600, but in which the comb teeth of each of the comb drives gets shorter the further the drive is from cross bar 1711. Advantageously, space is conserved while the voltage required for activating structure 1700 is reduced. FIG. 17*b* shows structure 1700 but where the drives are energized to achieve piston motion. FIG. 17*c* shows a top view of structure 1700.

FIGS. 18–23 show the results after various processing steps that are undertaken to fabricate a structure which can activate a plate, e.g., a micro mirror, so as to move the plate with a piston motion, such as structure 600 (FIG. 6) which includes comb drives and a split cross bar. The "A" version of each FIG. number is a cross-sectional view, and the "B" version of each FIG. number is the corresponding top view.

FIG. 18A shows the starting point of the process. More particularly, the process starts with a wafer e.g., wafer 1801, with through-wafer connections that have a conducting portion 1817 and an electrical insulating portion 1819 that insulates the conducting portion from the rest of the wafer, on which a thin layer of insulating material, e.g., silicon oxide 1855, is deposited. Thereafter, as shown in FIG. 18B, vias, e.g. holes, are patterned onto insulating material and then etched through insulating material. Some of the holes, e.g., holes 1875, are positioned so that a contact may be made through the hole to the wafer itself, also known as the handle wafer. Others of the holes, e.g., holes 1877, are positioned so that a contact may be made through the hole to conducting portions 1817.

A layer of polysilicon, e.g., 5 microns in thickness, is deposited over the entire surface of the wafer, filling in the previously-made holes in the oxide. The polysilicon is patterned and etched down, stopping on the underlying oxide layer 1855 to leave behind in polysilicon pattern 1979, shown in white in FIG. 19B. Pattern 1979 corresponds to the formation of comb drives and walls 115.

A thick layer of silicon oxide is deposited on wafer 1801, thereby filling in the cavities created by the previous etching of the polysilicon, and coating the top of the entire surface of the wafer. The silicon oxide surface of the wafer is polished, e.g., using a well-known chemical-mechanical polishing (CMP) technique, with the polishing stopping when the height of the polysilicon layer is encountered.

A thin silicon oxide layer is deposited on the polished surface of the wafer. The thin silicon oxide is patterned for holes 1881 as shown in FIG. 20B. The holes are over the area under which there is 5 micron polysilicon layer. The thin silicon oxide is then etched according to the pattern down to the height of the 5 micron polysilicon layer, thereby forming holes that reach down through the silicon oxide to the 5 micron polysilicon.

A very thin conformal polysilicon layer, e.g., 0.05 microns thick, layer is deposited on the wafer. The polysilicon reaches down through the holes in the oxide and connects to the 5 micron polysilicon layer exposed by the holes. The very thin conformal polysilicon layer is then patterned and etched to form the pattern 1883 shown in FIG. 21B. Doing so creates the structure for the deformable spring bars and the slotted cross bar structure.

Figure 22A:
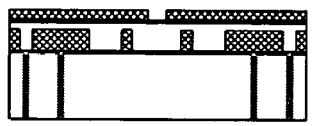

Silicon oxide layer 1893, again a thin layer e.g., a micron or less, is deposited on the wafer, covering over the entire surface, including the just formed deformable spring bars and the slotted cross bar structure. As shown in FIG. 22A, a central via, via 1891, is patterned and etched into silicon oxide layer 1893, stopping at the height of the very thin conformal polysilicon layer. This via is employed to form the post coupling the mirror to the slotted cross bar. The post and plate for the mirror are formed by depositing a polysilicon layer, e.g., a micron thick, over the surface of the wafer, at least partly filling via 1891, at least to the point that it connects to the slotted cross bar formed in the underlying polysilicon layer.

Figure 23A:
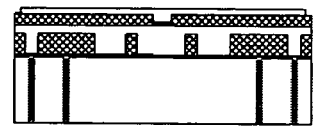
Figure 22B:
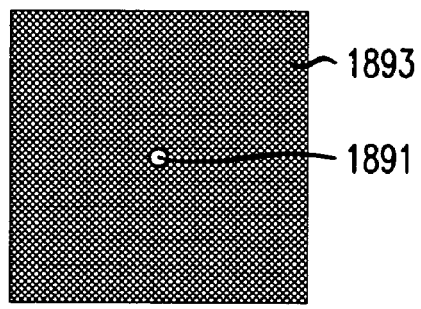
Figure 23B:
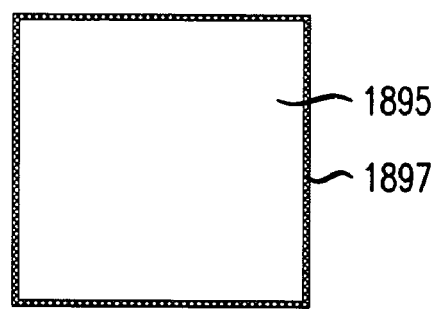
Figure 24A:
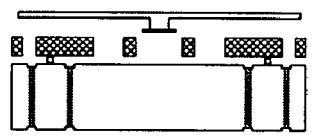
Figure 24B:
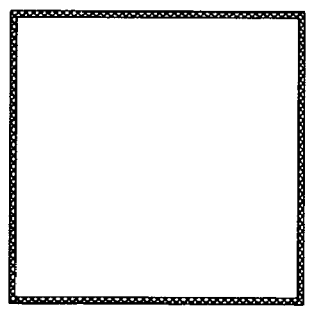

Optionally, to a polishing operation, e.g., another CMP polishing, is performed on the upper polysilicon layer to produce a flat surface for the plate, such as suitable for use as a mirror. The polysilicon is patterned and etched so as to define the boundary of each individual mirror on the wafer. FIG. 23A shows upper polysilicon layer 1895 with boundary 1897 etched away, revealing underlying oxide layer 1893. The edge of the mirror plate must also be cut back to allow access for the wet etch solution into which the structure is next bathed to have access to the silicon oxide. The wet etch bath removes substantially all the silicon oxide applied during the above-described steps so as to release the polysilicon structure. FIG. 24A shows the released structure. An exemplary wet etch solution is hydrofluoric acid.

The wet etch bath may also remove some of electrical insulating portion 1819, which may also be silicon oxide. However, because insulating portion 1819 is so much thicker than the deposited silicon oxide, any amount that is removed is negligible, and conducting portion 1817 has enough inherent stability to not contact the exposed portion of wafer 1801. Alternatively, silicon nitride could be used to cap oxide regions that should not be removed, e.g., insulating portion 1819.

Those of ordinary skill in the art will readily recognize how the various steps and different patterns may be combined to create different versions of the mirror structure, such as those described hereinabove.

In an embodiment of the invention for which the density of the micro mirrors may be lower, contacts need not be run through the wafer. Instead, the same processing could be performed, except that wires could be routed on the surface of the wafer to the various contact points prior to beginning the process described hereinabove.

Table 1 shows in its rightmost column the displacement z for piston movement, or the rotation angle θ for tip motion, given a particular voltage applied across the comb drives of the various embodiments listed by the FIG. in which they appear in the leftmost column.

TABLE 1

| | |
|---|---|
| FIG. 5 | $V^2 = 4.82 \times 10^{10} \frac{g_o w_s h_s^3}{n_t h_e^2 l_s^2} z.$ |
| FIG. 6 | $V^2 \approx \frac{1}{2} \cdot 4.82 \times 10^{10} \frac{g_o w_s h_s^3}{n_t h_e^2 l_s^2} z.$ |
| FIG. 11 | $V^2 = 5.3 \times 10^7 \frac{w_s g h_s^3}{l_s n_t h_e^2} \theta_{mirror,deg}$ |
| FIG. 13 | $V^2 = 16 \cdot 5.3 \times 10^7 \frac{w_s g h_s^3}{l_s n_t h_e^2} \theta_{mirror,deg}.$ |
| FIG. 15 | $V^2 = 8 \cdot 5.3 \times 10^7 \frac{w_s g h_s^3}{l_s n_t h_e^2} \theta_{mirror,deg}.$ |
| FIG. 16c See paper 99 | $V^2 \approx \frac{1}{6} \cdot 4.82 \times 10^{10} \frac{g_o w_s h_s^3}{n_t h_e^2 l_s^2} z.$ |

Note that the equations assume lengths are measured in microns and angles in degrees.
The variables in the equations of Table 1 are as follows:
V is the applied voltage;
z is the vertical displacement of the mirror;
θ is the rotation angle of the mirror;
$w_s$ is the width of the spring beam;
$h_s$ is the thickness of the spring beam;
$l_s$ is the length of the spring beam measured to the mirror attachment point;
$h_e$ is the vertical thickness of the drive;
$g_o$ is the gap spacing between mating comb teeth; and
$n_t$ is the number of teeth on one side of the comb drive.

Advantageously, because of the high density of mirrors that can be achieved, an array of mirrors can be employed to function as a computer controlled mask for use in fabricating other devices in lieu of conventional masks. Additionally, such high density mirrors may find use in display applications.

What is claimed is:

1. A micro-electromechanical systems (MEMS) device, comprising:
   a plurality of spaced deformable spring bars, each of said deformable spring bars being coupled together at least at a first surface thereof; and
   a first moveable drive plate coupled to said deformable spring bars on a surface of said deformable spring bars opposite to first surface, said first moveable drive plate being adapted to cause said deformable spring bars to torque in a local vicinity of their coupling location to said drive plate.

2. The invention as defined in claim 1 wherein said deformable spring bars are substantially parallel.

3. The invention as defined in claim 1 further comprising a plate coupled to at least two of said spring bars and said moveable drive plate.

4. The invention as defined in claim 1 wherein said deformable spring bars are coupled by cross bar.

5. The invention as defined in claim 4 wherein said cross bar has at least one slit therein.

6. The invention as defined in claim 4 further comprising:
   a support coupled at a first end thereof to said cross bar; and
   a plate coupled to said support at a second end thereof that is opposite to said first end.

7. The invention as defined in claim 6 wherein said support is a post.

8. The invention as defined in claim 6 wherein said plate is a mirror.

9. The invention as defined in claim 6 wherein said plate has a shape selected from one of the set of shapes consisting of: substantially square, substantially rectangular, substantially hexagonal, substantially round.

10. The invention as defined in claim 1 wherein said first moveable drive plate is part of a first comb drive.

11. The invention as defined in claim 1 wherein said first moveable drive plate is part of a first flat plate drive.

12. The invention as defined in claim 1 wherein at least one of said deformable spring bars is supported at both of its ends.

13. The invention as defined in claim 1 wherein each of said deformable spring bars are supported at both of their ends.

14. The invention as defined in claim 1 wherein said deformable spring bars are supported at least one end.

15. The invention as defined in claim 1 wherein said deformable spring bars are supported at least one end by a wall.

16. The invention as defined in claim 15 wherein said wall is adapted to operate as an electrical shield.

17. The invention as defined in claim 1 further comprising a fixed drive plate mated to said moveable drive plate.

18. The invention as defined in claim 17 wherein said fixed drive plate is electrically isolated from said moveable drive plate, whereby a potential difference may exist between said fixed drive plate and said moveable drive plate.

19. The invention as defined in claim 1 wherein said moveable drive plate is coupled to said deformable spring bars about midway between an end of said deformable spring bars and the middle of said deformable spring bars.

20. The invention as defined in claim 1 wherein said cross bar is split at least partway across.

21. The invention as defined in claim 1 further comprising a second moveable drive plate coupled to said deformable spring bars on a surface of said deformable spring bars opposite to said first surface.

22. The invention as defined in claim 21 wherein said first moveable drive plate and said second moveable drive plate are both coupled to said deformable spring bars between the same end of said deformable spring bars and the middle of said deformable spring bars.

23. The invention as defined in claim 21 wherein said first moveable drive plate is coupled to said deformable spring bars between a first end of said deformable spring bars and the middle of said deformable spring bars and said second moveable drive plate is coupled to said deformable spring bars between a second end of said deformable spring bars that is opposite to said first end and the middle of said deformable spring bars.

24. The invention as defined in claim 21 wherein said first moveable drive plate and said second moveable drive plate are arranged so that said torque applied by each in said local vicinity of their respective coupling locations to said drive plate is additive.

25. The invention as defined in claim 21 wherein said first moveable drive plate and said second moveable drive plate are each part of respective comb drives, and wherein the further each of said comb drives is coupled from a point at which said deformable spring bars are coupled to a plate, the longer are the combs of said comb drives.

26. The invention as defined in claim 21 wherein said first moveable drive plate and said second moveable drive plate are each part of respective comb drives arranged so that said torque applied by each of their respective moveable drive plates in said local vicinity of their respective coupling locations to said deformable spring bars is additive, and wherein the further each of said comb drives is coupled from a point at which said deformable spring bars are coupled to a plate, the longer are the combs of said comb drives.

27. A micro-electromechanical systems (MEMS) device, comprising:
at least one deformable spring bar coupled at a first surface thereof to a plate; and
a first moveable drive plate coupled to said at least one deformable spring bar on a surface thereof opposite to said first surface, said first moveable drive plate being adapted to cause said at least one deformable spring bar to torque in a local vicinity of its coupling location to said drive plate.

28. The invention as defined in claim 27 wherein said at least one deformable spring bar is one of a plurality of deformable spring bars.

29. The invention as defined in claim 28 wherein said at least deformable spring bar one deformable spring bar and at least one other of said plurality of deformable spring bars are substantially parallel to each other.

30. The invention as defined in claim 28 wherein at least one other of said plurality of deformable spring bars is also coupled to said first moveable drive plate.

31. A micro-electromechanical systems (MEMS) device, comprising;
deformable support means, said deformable support means including at least one deformable spring bar; and
drive means coupled to one surface of said deformable support means to cause said deformable support means to torque in a local vicinity of their coupling location to said drive means.

32. The invention as defined in claim 31 further comprising a plate coupled to said deformable support means on a surface opposite to said one surface.

33. The invention as defined in claim 32 further wherein deformation of said deformable support means induces piston motion by said plate.

34. The invention as defined in claim 32 further wherein deformation of said deformable support means induces tilt motion by said plate.

35. The invention as defined in claim 31 wherein said deformable support means is supported from at least one wall mounted on a substrate.

36. The invention as defined in claim 31 wherein said deformable support means is a plurality of spaced deformable spring bars.

37. The invention as defined in claim 31 wherein said drive means is an electrostatic drive.

38. The invention as defined in claim 37 wherein said electrostatic drive is a comb drive.

39. The invention as defined in claim 37 wherein said electrostatic drive is a flat plate drive.

* * * * *